UNITED STATES PATENT OFFICE.

WESLEY SMITH, OF TOLEDO, OHIO, ASSIGNOR OF ONE-HALF TO HENRY KAHLO AND WILLIAM H. CRAY, OF SAME PLACE.

PROCESS OF PRESERVING MEAT, &c.

SPECIFICATION forming part of Letters Patent No. 431,407, dated July 1, 1890.

Application filed March 5, 1890. Serial No. 342,782. (No specimens.)

*To all whom it may concern:*

Be it known that I, WESLEY SMITH, a citizen of the United States, residing at Toledo, in the county of Lucas and State of Ohio, have invented certain new and useful Improvements in a Process of Preserving Meats and Other Perishable Articles during Transportation; and I do hereby declare that the following is a full, clear, and exact description of the invention, which will enable others skilled in the art to which it appertains to make and use the same.

My invention relates to a process of preserving meats and other perishable articles during transportation or storage; and it has for its object the complete preservation of the articles without the use of ice, thereby not only saving the ordinary expense of refrigeration, but transporting the same in a dry and normal condition.

A further object of my process is to transport meats and other perishable articles in a condition removed from atmospheric influences.

A further object is to remove from the receptacle in which the perishable articles are placed all germs from inorganic matter or from decomposing organic matter, thereby preventing the contamination and injury of the articles to be preserved.

My invention consists in preserving meats and other perishable articles by placing the same in an air-tight receptacle, then exhausting the air therefrom, then forcing sterilized air through the receptacle, and, finally, again exhausting the air and hermetically sealing the receptacle.

In carrying out my process in the transportation of meats or perishable vegetable matter a car is rendered air-tight by any preferred form of non-conductive packing, and the meats or other perishable articles are placed within the car. The air is now exhausted from the car, preferably by suction, as it is desired that not only all the air that may be impregnated with germs of decomposition or parasitic animal life or fermentative conditions shall be removed, but that a volume of fresh air shall be introduced to assist in fully and completely expelling this air from the car and replacing the same. Having now removed the air originally in contact with the perishable articles and substituted a fresh volume of atmospheric air therefor, if the meats to be transported have been under conditions since being dressed that would be calculated to cause fermentative or primary stages of decomposition, a vaccum is now formed in the car by withdrawing the air as nearly as possible, when sterilized air or air heated to destroy bacteria or fermentative influence is cooled in a receiver and forced into the car, thereby receiving any bacteria or germs of decomposition or ephemera of any character which may be upon the meat and not previously removed, when the air is again withdrawn and a vacuum is formed in the car with the perishable articles remaining *in vacuo*, in which condition they are transported to their place of destination.

By my process the meat (if this is the article to be transported) is delivered dry and in a normal condition, a result that cannot be attained by refrigeration through the medium of ice, and vegetable food may be transported in a fresh and natural state.

What I claim is—

The herein-described process of preserving meats and other perishable foods, which consists in placing the same in a receptacle capable of being made air-tight, exhausting the air therefrom, forcing a current of sterilized cooled air through the receptacle, again exhausting the air, and, finally, sealing the receptacle, thus placing the contents in a sterilized attenuated atmosphere, as set forth.

In testimony that I claim the foregoing as my own I hereby affix my signature in presence of two witnesses.

WESLEY SMITH.

Witnesses:
CARROLL J. WEBSTER,
W. H. CRAY.